United States Patent
Rabb et al.

(10) Patent No.: US 10,274,377 B1
(45) Date of Patent: Apr. 30, 2019

(54) SPECTRAL SHEARING LADAR

(71) Applicant: The United States of America as represented by the Secretary of the Air Force, Washington, DC (US)

(72) Inventors: David J. Rabb, Dayton, OH (US); Jason W. Stafford, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 57 days.

(21) Appl. No.: 15/782,327

(22) Filed: Oct. 12, 2017

Related U.S. Application Data

(60) Provisional application No. 62/489,078, filed on Apr. 24, 2017.

(51) Int. Cl.
*G01B 9/02* (2006.01)
*G01B 11/16* (2006.01)
*G01S 17/89* (2006.01)
*G01J 9/02* (2006.01)
*G01J 9/04* (2006.01)

(52) U.S. Cl.
CPC ........ *G01J 9/0246* (2013.01); *G01B 9/02098* (2013.01); *G01B 11/162* (2013.01); *G01J 9/04* (2013.01); *G01S 17/895* (2013.01)

(58) Field of Classification Search
CPC ............ G01B 9/02032; G01B 9/02097; G01B 9/02098; G01B 11/162; G01S 17/89; G01S 17/895; G01J 9/0215; G01J 9/0246; G01J 9/04

See application file for complete search history.

(56) References Cited

U.S. PATENT DOCUMENTS

| 6,611,336 B1 | 8/2003 | Walmsley |
| 6,633,386 B2 | 10/2003 | Walmsley |
| 8,064,065 B2 | 11/2011 | Bennett |
| 8,896,818 B2 * | 11/2014 | Walsh ................ G01S 7/4818 356/4.01 |
| 9,013,705 B2 | 4/2015 | Bennett |

(Continued)

OTHER PUBLICATIONS

Adam S. Wyatt, Alexander Grün, Philip K. Bates, Olivier Chalus, Jens Biegert, and Ian A. Walmsley, "Accuracy measurements and improvement for complete characterization of optical pulses from nonlinear processes via multiple spectral-shearing interferometry," Opt. Express 19, 25355-25366 (2011).

(Continued)

*Primary Examiner* — Michael A Lyons
(74) *Attorney, Agent, or Firm* — AFMCLO/JAZ

(57) ABSTRACT

A ladar device that has a linear frequency-modulated laser source that produces a primary beam. An optical shear generator spectrally shears the primary beam into no less than three sensing beams. An optical output delivers at least one of the sensing beams toward a target. The sensing beams reflect from the target to produce reflected beams. An optical receiver receives the reflected beams and produces reflected beam signals corresponding to characteristics of the reflected beams. A processor receives the reflected beam signals and produces a deviation matrix, without the use of a local oscillator. The deviation matrix is used to produce a reconstruction of the target, which is output on an electrical signal output.

20 Claims, 2 Drawing Sheets

(56) References Cited

U.S. PATENT DOCUMENTS

| | | | |
|---|---|---|---|
| 9,581,967 B1 | 2/2017 | Krause | |
| 10,094,925 B1 * | 10/2018 | LaChapelle | G01S 7/483 |
| 2001/0040682 A1 * | 11/2001 | Lindsay | G01B 9/025 |
| | | | 356/520 |
| 2007/0171422 A1 | 7/2007 | Birge | |
| 2008/0074640 A1 * | 3/2008 | Walsh | G01S 7/4818 |
| | | | 356/5.01 |
| 2012/0044320 A1 | 2/2012 | Spivey | |
| 2012/0120410 A1 * | 5/2012 | Sitter, Jr. | G01J 9/0215 |
| | | | 356/520 |
| 2013/0188167 A1 | 7/2013 | Halmos | |

OTHER PUBLICATIONS

Richard A. Hutchin, "Sheared coherent interferometric photography: a technique for lensless imaging", Proc. SPIE 2029, Digital Image Recovery and Synthesis II, 161 (Nov. 9, 1993).

Charles V. Jakowatz and Daniel E. Wahl, "Eigenvector method for maximum-likelihood estimation of phase errors in synthetic-aperture-radar imagery," J. Opt. Soc. Am. A 10, 2539-2546 (1993).

Cho,k "Real-Time 3D Ladar Imaging," vol. 16, No. 1, 2006 Lincoln Laboratory Journal, pp. 147-164.

McManamon, "Review of ladar: a historic, yet emerging, sensor technology with rich phenomenology," Optical Engineering 51(6), 060901 (Jun. 2012) pp. 060901-01-060901-13.

\* cited by examiner

SPECTRAL SHEARING LADAR

Pursuant to 37 C.F.R. § 1.78(a)(4), this application claims the benefit of and priority to prior filed Provisional Application Ser. No. 62/489,078, filed 24 Apr. 2017, which is expressly incorporated herein by reference.

GOVERNMENT INTEREST

The invention described herein may be manufactured, used, and licensed by or for the Government of the United States for all governmental purposes without the payment of any royalty.

FIELD

This invention relates to the field of electronic sensors. More particularly, this invention relates to electronically sensing the shape of surfaces from a distance.

INTRODUCTION

Ladar (also referred to as lidar and laser radar) is a portmanteau of laser and radar, which is also known as laser detecting and ranging. All ladar instruments have a transmitter and a receiver, where the transmitter is a laser source used to illuminate an object of interest, and the receiver includes photodetectors that detect the laser light reflected from the object. One of the most common ladar instantiations is a direct detect ladar with a high speed detector array.

In this variant, the transmitter creates a short laser pulse that is directed toward the object, which reflects the laser pulse back toward the receiver. A lens in the receiver forms an image of the object on a high speed detector array, and then the time of arrival for the reflected pulse is recorded separately for each pixel in the array. The timing for each pixel can be used to determine an effective range of the object, based on the speed of light for the roundtrip distance. The pixel timing is used together with the two-dimensional cross-range information, based on the specific pixel location, to calculate points on the object in all three spatial dimensions.

By combining the points for each pixel in the array, a three-dimensional image can be constructed. However, the cross-range resolution is limited by detector sampling or optical aberrations, or is diffraction-limited based on the receiver aperture size (the diameter of the lens used for imaging).

In contrast to direct detect ladars, coherent ladars capture the optical phase information of the returning light. Because of this ability and the desire to use longer, higher energy pulses, range measurements are typically not based on short-pulse, time-of-flight measurements, but on information embedded within the returning light. One of the most common waveforms used for range measurements for coherent systems is constant in amplitude, with a linear frequency modulation chirp. In this case, the timing of reflected beam returns from the object no longer directly correspond to range information. Instead, range information is contained within the range spatial frequency content of the beam returns, namely in their phase and amplitude information. The range spatial frequency content is related to the object's range through a Fourier transform, in the same way that time and frequency are Fourier transforms of one another. In this case, the range resolution is no longer a function of the pulse length, but is a function of the extent of the frequency modulation, or chirp bandwidth, where the range resolution is inversely proportional to the chirp bandwidth.

However, in order to detect the phase of the returning light, coherent systems require a reference, such as a local oscillator. When using a linear frequency modulation source, the local oscillator is a delayed copy of the transmitter output. When the local oscillator and the return light interfere with one another at the receiver, the phase difference between the two paths is recorded. Effectively, the local oscillator is made to look like a bright point return near the scene from the perspective of the receiver, and the relative phase measurements that are recorded indicate the position of objects relative to that point. The use of linear frequency modulation with a delayed copy of the transmitter output for the local oscillator is commonly referred to stretch processing.

While coherent systems typically use a local oscillator, other variants use phase-retrieval of self-referencing techniques in order to find the optical phase information. Self-referencing approaches have more in common with a local oscillator based approach, in that the detector measurements give the phase difference between two or more optical fields. However, in the self-referencing case, the phase differences measured are not with respect to a well-characterized local copy of the laser light, but most commonly a shifted copy of the light being reflected by the object. These systems typically create the shifted copies of the reflected field by simultaneously illuminating the object with multiple transmitters, each a slightly shifted copy of another, often referred to as spatial shears.

While spatial shearing approaches typically reconstruct a field for one wavelength or optical frequency at a time, multiple wavelengths can be used sequentially to get range information about the object. In many cases, only two wavelengths or frequencies are used, enabling high precision ranging, but no ability to resolve multiple returns from the object in range, which are unresolved cross-range. This is problematic for systems that have poor resolution in one of the cross-range dimensions, such as synthetic aperture ladars (the optical analog to synthetic aperture radar), which have high resolution in the azimuth cross-range dimension, but poor resolution in the elevation cross-range dimension.

As a result, there exists an unmet need in the art for a self-referencing ladar with an improved resolution in one or more cross-range dimensions. More specifically, a need exists to resolve multiple object returns within a cross-range pixel, such as by reconstructing optical phase information in the filled spectrum associated therewith. A further need exists to resolve such returns via simplified receiver architectures that do not require high coherence sources, local oscillators, or frequency and timing adjustments of the same to match returning signals.

SUMMARY

The above and other needs are met by a ladar device that has a linear frequency-modulated laser source that produces a primary beam. An optical shear generator spectrally shears the primary beam into no less than three sensing beams. An optical output delivers at least one of the sensing beams toward a target. The sensing beams reflect from the target to produce reflected beams. An optical receiver receives the reflected beams and produces reflected beam signals corresponding to characteristics of the reflected beams. A processor receives the reflected beam signals and mathematically compares them to sensing beam signals corresponding to characteristics of the sensing beams to produce a deviation matrix, without the use of a local oscillator. The deviation matrix is used to produce a reconstruction of the target, which is output on an electrical signal output.

In this manner, spectral shearing ladar uses multiple linear frequency modulation transmitted waveforms that are frequency shifted with respect to one another, each being a spectral shear. Since the frequency for a linear frequency modulation waveform by definition changes linearly with time, frequency-shifted copies of the waveform can be made by creating multiple copies of a single linear frequency modulation source, applying varying delays, and then recombining as appropriate. To separate the interference that gives the phase relationships between the frequencies, each of the spectral shears is a different size, meaning that the frequency separations are non-redundant.

In various embodiments according to this aspect of the invention, the laser source is operated in a continuous wave mode and not in a pulsed mode. In some embodiments, the optical shear generator includes optical paths of differing lengths, and at least one optical divider that creates the sensing beams and sends them down the optical paths. In some embodiments, the optical output recombines the sensing beams along a common path prior to delivering the sensing beams toward the target. In some embodiments, a separate optical output is provided for each of the sensing beams, and the optical outputs are spatially separated. In some embodiments, the optical receiver is a single pixel device. In some embodiments, the optical receiver is a device with a one-dimensional pixel array. In some embodiments, the optical receiver has an imaging device at a pupil plane of the optical receiver, and no focusing lens. In some embodiments, the optical shear generator comprises a frequency shifter for each sensing beam created. In some embodiments, the characteristics of both the reflected beams and the sensing beams include both amplitude and phase information.

According to another aspect of the invention there is described a ladar device that includes a continuous mode, linear frequency-modulated laser source that produces a primary beam. An optical shear generator spectrally shears the primary beam into no less than three sensing beams, using optical paths of differing lengths and at least one optical divider that creates the sensing beams and sends them down the optical paths. An optical output delivers all of the sensing beams toward a target, which reflects them to produce reflected beams. An optical receiver receives the reflected beams and produces reflected beam signals corresponding to characteristic of the reflected beams. A processor receives the reflected beam signals and mathematically compares them to sensing beam signals that corresponding to characteristics of the sensing beams, to produce a deviation matrix without use of a local oscillator. The deviation matrix is used to produce a reconstruction of the target, and an electrical signal output outputs the reconstruction.

In some embodiments according to this aspect of the invention, the optical output recombines the sensing beams along a common path prior to delivering the sensing beams toward the target. In some embodiments, a separate optical output is provided for each of the sensing beams, and the optical outputs are spatially separated. In some embodiments, the optical receiver is a single pixel device. In some embodiments, the optical receiver is a device with a one-dimensional pixel array. In some embodiments, the optical receiver has an imaging device at a pupil plane of the optical receiver, and no focusing lens. In some embodiments, the characteristics of both the reflected beams and the sensing beams include both amplitude and phase information.

According to yet another aspect of the invention there is described a ladar device having a linear frequency-modulated laser source that is configured to produce a primary beam. An optical shear generator spectrally shears the primary beam into no less than three sensing beams. An optical output delivers at least one of the sensing beams toward a target, with the sensing beams reflecting from the target to produce reflected beams. An optical receiver with an imaging device at a pupil plane of the optical receiver, and no focusing lens, receives the reflected beams and produces signals corresponding to characteristic of the reflected beams. A processor receives the reflected beam signals and mathematically compares them to sensing beam signals corresponding to characteristics of the sensing beams to produce a deviation matrix, without the use of a local oscillator. The deviation matrix is used to produce a reconstruction of the target, and an electrical signal output outputs the reconstruction.

In some embodiments according to this aspect of the invention, the optical shear generator includes optical paths of differing lengths, and at least one optical divider that creates the sensing beams and sends them down the optical paths. In some embodiments, the optical shear generator includes a frequency shifter for each sensing beam created.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
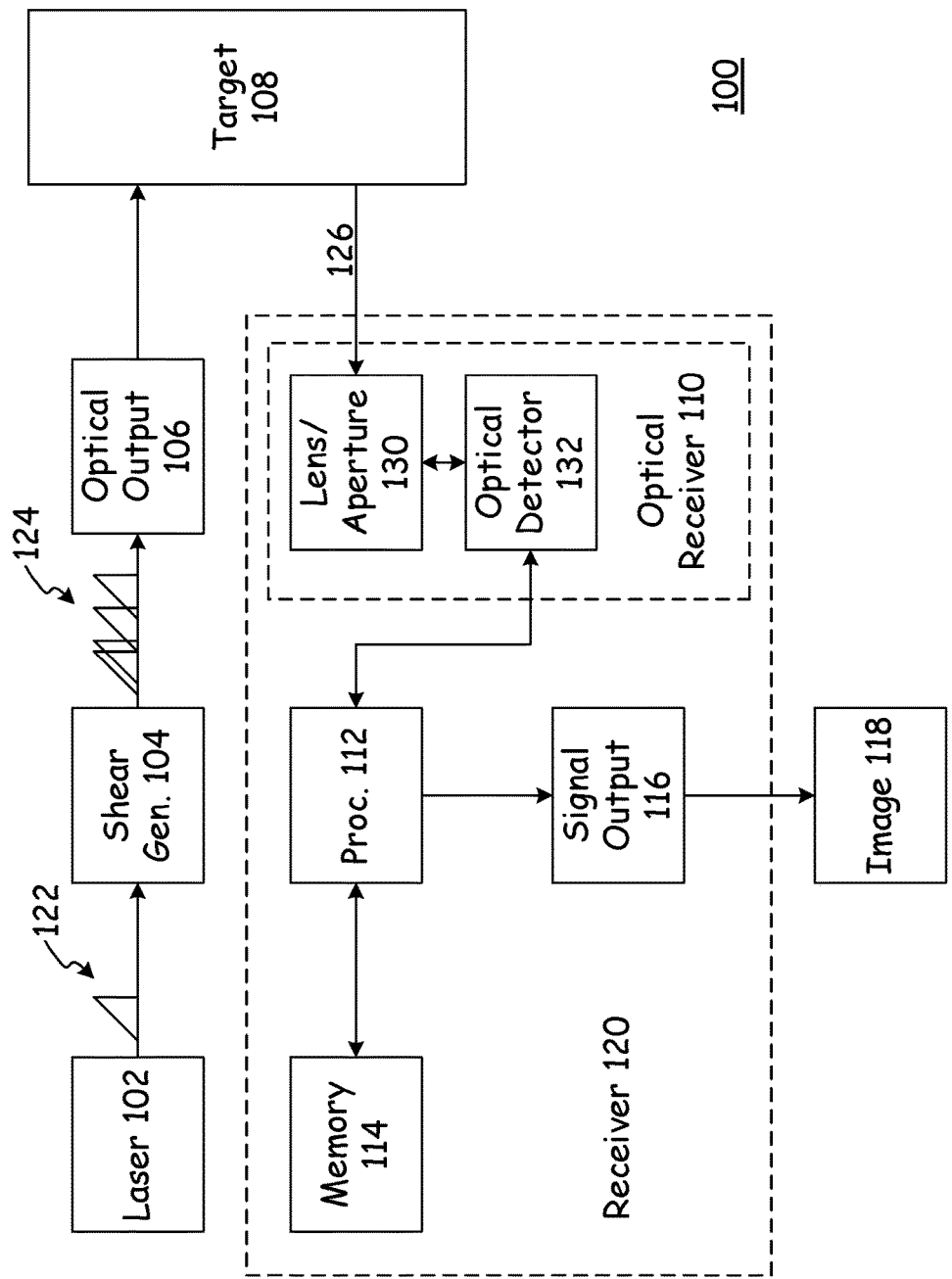
FIG. 1 is a functional schematic of a spectral shearing ladar system according to an embodiment of the present invention.

Embodiments of the disclosed invention include a self-referencing technique using multiple delayed or spectrally-shifted, linear, frequency-modulated waveforms. The intensity due to the interference of the waveforms, after reflecting off an object of interest, is recorded and processed to provide both the amplitude and phase of the optical field allowing for diffraction limited digital image formation. Having the optical field information also enables a number of aperture synthesis techniques, which improve cross-range resolution. This can be accomplished using a single pixel receiving device in the case of a diffraction limited illumination beam, or a receiving device capable of recording a two-dimensional pixel array of measurements for a flood illuminated scene. An algorithm, described in greater detail below, allows for the range profile of the object to be modeled for each pixel based on the recorded intensity. For the case of a one-dimensional or two-dimensional array of detector elements, it is also possible to have spatial shears in the transverse dimensions, which improve the three-dimensional modelling of the object. The model includes the phase of the object for the coherent illumination, so it is compatible with other coherent sensing modalities, such as multi-statics, synthetic aperture, and vibrometry.

One benefit of the various embodiments of the invention is a sensor that is capable of modeling three-dimensional images, including coherent phase information, without requiring a local oscillator at the receiver to recombine the sent beam with the return beam. Existing spatial shearing techniques allow for two-dimensional models with phase information, but lack the spectral diversity needed for compression along the range dimension. Further, existing spectral shearing techniques have been developed for laser pulse characterization, but not for image modelling using a received electro-magnetic field that has interacted with an object of interest. This is accomplished by using a well characterized illumination source, such as, in one embodiment, a linear frequency modulated waveform that is treated to solve for the frequency dependent complex reflectivity of the scene. Furthermore, by solving for this complex reflectivity at multiple cross-range locations in the receiver, a three-dimensional scene can be reconstructed, as opposed to the one-dimensional signal reconstructed for laser pulse characterization.

The disclosed invention is applicable to remote sensing, metrology, non-destructive testing, automotive lidar, medical imaging, and intelligence, surveillance, and reconnaissance sensors. Self-referencing approaches, such as those described herein, allow greater immunity to aberrations, such as from atmospheric turbulence, and simplify multistatic coherent sensors by eliminating the need for a local oscillator, thus simplifying receiver optics. Essentially, the disclosed self-referencing approach, low size, weight, and power conformal receiver can be separated from the transmitter platform, which is ideal for bistatic attritable/expendable receiver platforms performing combat identification and other intelligence, surveillance and reconnaissance missions.

The coherent phase information that is recovered using various embodiments of the present invention enables digital field manipulation, including multiple forms of aperture synthesis for high resolution imaging and aberration correction, as well as laser vibrometry.

In accordance with some embodiments of the disclosed invention, the illumination source uses a linear frequency-modulated laser, which is split into multiple spectral shears. The spectral shears can be created by using varying time delays (fiber lengths) or through frequency shifting (acousto-optic modulator). The multiple copies of the beam then simultaneously illuminate an object, either from a single or multiple transmitter locations. The shears interfere on the object, and the modulated signal is reflected back to the receiver, which can be a single pixel, one-dimensional array, or two-dimensional array of detector elements. The detector spacing may be smaller or equal to the coherent speckle size that arises from the object illumination, and have sufficient temporal bandwidth as determined by the object extent in all dimensions, spectral shear sizes, and chirp rate of the laser. The recorded intensity is then processed to model the coherent field.

It should be noted that any number of shears can be used, with significant flexibility to adjust lateral locations of transmitters. While exemplary embodiments focus on the use of linear frequency modulation, other waveforms may be used, provided that the waveform can be treated as a known for the purpose of modelling. The operation is focused on a reflective geometry, but a transmissive geometry could be used, similar to approaches for ultra-short pulse characterization, which may be of interest for biomedical applications. In such embodiments, the transmitter and receiver are on opposite sides of the target, and instead of recording the reflected field, the transmitted field is recorded.

Example Structure

With reference now to FIG. 1, there is depicted an embodiment of a spectral shearing ladar 100 according the present invention. The ladar 100 includes a laser source 102 that produces a primary beam 122. The laser source 102 in one embodiment produces a primary beam 122 that is linear frequency modulated. In some embodiments, the laser source 102 is operated in a continuous mode. This doesn't mean that the laser source 102 is always on, but it means that when it is on, the primary beam 122 is continuously produced, and the laser source 102 does not pulse the primary beam 122 on and off.

The primary beam 122 is delivered to a shear generator 104 that produces spectral (frequency) shears 124. These spectral shears 124 are out of phase, one with another, by some known amount. The spectral shears 124 are also referred to elsewhere herein as sensing beams. In some embodiments, at least three spectral shears 124 are produced by the shear generator 104.

In one embodiment, the shear generator 104 produces the spectral shears 124 by beam-splitting the primary beam 122 and passing the split portions of the primary beam 122 along different light conducting paths that have one or more of different lengths or are formed of different materials, such that the split portions require differing lengths of time to traverse the different light conducting paths. In other embodiments, the split portions are passed through separate beam amplifiers that amplify each split portion to a different degree.

In some embodiments, the spectral shears 124 are rejoined along a common path prior to being output with an optical output 106. Thus, in such embodiments, the spectral or frequency shears 124 are not spatial shears that are emitted from separate locations, but instead are all emitted from a common point. The optical output 106 is, in some embodiments, a collection of lenses and other optical elements that direct the spectral shears 124 toward a target surface 108, from which they are reflected as reflected beams 126.

The reflected beams 126 are received by a receiver 120 that includes an optical receiver 110. In some embodiments, the optical receiver 110 receives the reflected beams 126 with elements such as optical lenses 130, and focuses the reflected beams 126 onto an optical detector 132. In other embodiments, there are no focusing optics, and the optical detector 132 is disposed at the pupil plane of an aperture 130 in the optical receiver 110.

The optical detector 132 takes varying forms in different embodiments. In some embodiments, the optical detector 132 is a single light detecting element, such as a charge-coupled device. In other embodiments, the optical detector is a one-dimensional array of such light detecting elements, such a row of pixels, and in other embodiments, the optical detector 132 is a two-dimensional array of light detecting elements. In some embodiments, the optical detector 132 measures both the phase and the amplitude of reflected beams 126 that it receives, and produces signals that correspond to these and, in some embodiments, other characteristics of the reflected beams 126.

The signals so produced by the optical receiver 110 are delivered to a processor 112, or in some embodiments, are stored in a memory 114, at least temporarily, and then acted upon by the processor 112. The section below describes in greater detail the method that is applied to the signals of the reflected beams 126 by the processor 112, which method compares them to signals that correspond to characteristics of the spectral shears 124, such as phase and amplitude, and produces a mathematical reconstruction or model of the target 108. The processor 112 produces signals that are characteristic of the model, and outputs them through a signal output 116 of the receiver 120. These signals can be received to produce an image 118 of the target 108.

In this manner, the ladar 100 is able to produce an image 118 of the target 108, without producing spatial shears (shears that are directed from the target 108 from different locations) and without use of a local oscillator in the receiver 120, or other device that directly compares an actual portion of the primary beam 122 with the reflected beams 126. While some prior art ladars are able to remove the need of a local oscillator in the receiver 120, they require the use of spatial shears that originate from different positions from one or more transmitters, and also require separate reconstruction of each optical frequency used. Alternately, while some prior art ladars are able to remove the need of spatial shears from the transmitter, they require the use of a local oscillator or similar device to compare the primary beam 122 to the reflected beams 126. Embodiments of the present invention, by contrast, are able to provide an image 118 without the use of spatial shears or a local oscillator (or equivalent structure).

One benefit of these embodiments is that they greatly simplify the architecture of receiver 120, which makes it less expensive to produce, and enables it to be more reasonably deployed in an attritable resource.

Example Method

In some embodiments, the spectral shears are non-redundant, meaning the spectral shears are separated in frequency for any set of two shears. To minimize receiver bandwidth in some embodiments, the shears are maximally compact, meaning that the largest separation is as small as possible while maintaining non-redundancy and sufficient bandwidth around each shear as required by the target range extent and laser chirp rate. In order to capture the mixing of all the non-redundant shears, increased bandwidth is required, where n shears require a minimum of n(n−1)+1 times the bandwidth at the receiver, compared to linear frequency modulation, with laser optics for the same range extent and chirp rate. For three-dimensional imaging, some shears may also be spatial, meaning that in addition to a frequency offset there may also be a shift in the sensing beams' cross-range location at the transmitter, but this is not required. Portions of the received intensity spectrum are used to populate a sparse covariance matrix for a linearized representation of the three-dimensional field, where the Eigenvector corresponding to largest eigenvalue gives the spectrally resolved field at the receiver.

Figure 2:
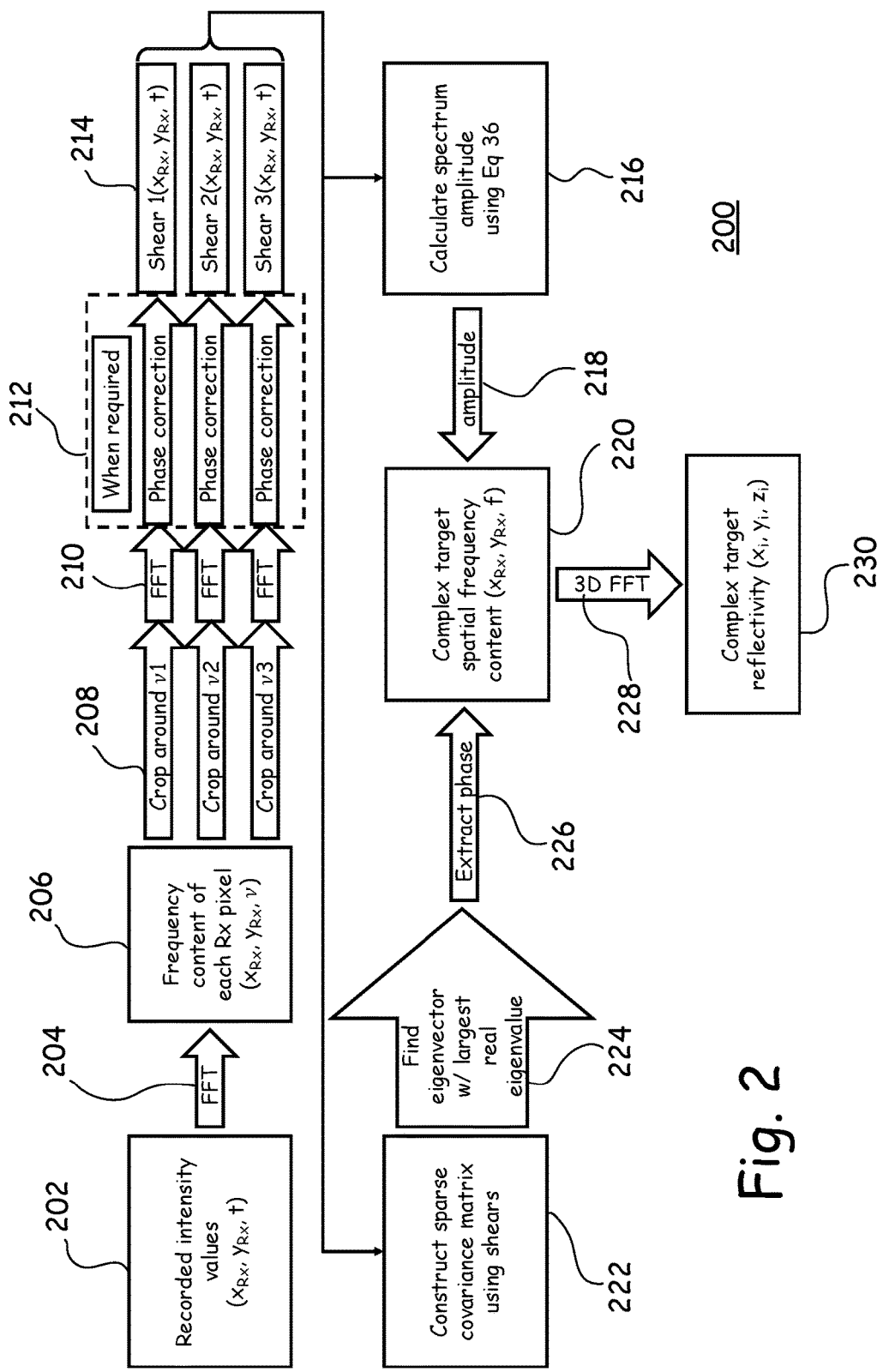
FIG. 2 is a flow chart depicting the steps for the operation of a spectral shearing ladar system for the case where three spectral shears are emitted by the transmitter and a two-dimensional detector array is used by the receiver, according to an embodiment of the present invention.

The method described below can be applied to any number of shears, but is initially presented for the specific case of two shears. At various points in the method, FIG. 2 is referenced. FIG. 2 is drawn for the specific case of three shears, which is also described in this section. Again, however, the method as described and depicted is applicable to any number of shears. For simplicity, the spectral shearing approach is described first for a single transverse resolution element or pixel. Let p(t) be a linear frequency modulation chirp used to illuminate the target such that $$p(t)=e^{j\pi\gamma t^2}. \quad (1)$$

Let u(t) be a target's complex reflectivity at a range equal to t/2c. The complex field returning from the target is then the convolution of the target with the pulse.

$$u(t)\otimes p(t)=\int u(T)e^{j\pi\gamma(t-T)^2}dT=e^{j\pi\gamma t^2}\int e^{j\pi\gamma T^2}u(T)e^{-j2\pi\gamma tT}dT \quad (2)$$

Let U(f) be the spatial frequency of the target with residual video phase.

$$U(f)=\mathcal{F}\left[e^{j\pi\gamma t^2}u(t)\right]=\int e^{j\pi\gamma t^2}u(t)e^{-j2\pi ft}dt \quad (3)$$

Using equations 1-3, the returning field can be rewritten in terms of U, where time is mapped to frequency by the relationship f=γt.

$$u(t)\otimes p(t)=p(t)U(\gamma t) \quad (4)$$

Let us consider two chirps that are used to illuminate the target simultaneously where one is delayed by a time τ with respect to the other.

$$p_1(t)=e^{j\pi\gamma t^2}=p(t)$$

$$p_2(t)=e^{j\pi\gamma(t+\tau)^2}=p(t)\otimes\delta(t+\tau) \quad (5)$$

The returning field, E(t), is then $$E(t)=u(t)\otimes p(t)+u(t)\otimes p(t)\otimes\delta(t+\tau) \quad (6)$$

Using the relationship of equation 4, the field at the receiver can be rewritten as $$E(t)=U(\gamma t)p(t)+U(\gamma t)p(t)\otimes\delta(t+\tau)$$

$$E(t)=U(\gamma(t))p(t)+U(\gamma(t+\tau))p(t)e^{j\pi\gamma(2t\tau+\tau^2)}. \quad (7)$$

The receiver intensity is then (as described in block 202 of FIG. 2)

$$I(t)=|U(\gamma t)|^2+|U(\gamma(t+\tau))|^2+U(\gamma t)U^*(\gamma(t+\tau))e^{-j\pi\gamma(2t\tau+\tau^2)}+U(\gamma(t+\tau))U^*(\gamma t)e^{j\pi\gamma(2t\tau+\tau^2)} \quad (8)$$

The temporal frequency extent, $v_{ext}$, of the two direct current terms is the same, and is set by the range extent of the target, $z_{ext}$, and the chirp rate. The greatest positive and negative frequencies arise from the mixing of scatters at the minimum and maximum ranges.

$$v_{ext}=v_{max}-v_{min}=\frac{2\gamma(z_{max}-z_{min})}{c}-\frac{2\gamma(z_{min}-z_{max})}{c}=\frac{4\gamma z_{ext}}{c}. \quad (9)$$

The last two terms have the same temporal frequency extent, but are offset in frequency by +γτ. In order to separate the spectra of the cross-terms from the direct current terms then $$\tau > \frac{v_{ext}}{\gamma} \quad (10)$$

$$\tau > \frac{4z_{ext}}{c}$$

Equation 10 shows that the delay between the two linear frequency-modulation pulses should be greater than four times the propagation time from the front of the target to the back. This goal, in some embodiments, is such that the various shears do not overlap in the frequency domain, and the unit step size for the shears is such that each one has sufficient bandwidth. Then the non-redundant aspect keeps each of the mixing terms from all shear combinations from being at the same frequency. The cross-terms, which are complex conjugates of one another, can be isolated by removing the carrier frequency and low pass filtering. Due to the pulses not having zero mean delay there is a constant phasor that is a function of $\tau^2$, which is also removed, as depicted in block 212 of FIG. 2. The DC term can be isolated in a similar fashion, but there is no need to remove a carrier frequency or piston term.

$$DC(t) = \mathcal{F}^{-1}\{w(v)\mathcal{F}[I(t)]\} = |U(\gamma t)|^2 + |U(\gamma(t+\tau)|^2 \quad (11)$$

$$AC(t) = \mathcal{F}^{-1}\{w(v)\mathcal{F}[I(t)e^{j\pi\gamma(2t\tau+\tau^2)}]\} = U(\gamma t)U^*(\gamma(t+\tau)), \quad (12)$$

$$w(v) = rect\left(\frac{v}{v_{ext}}\right). \quad (13)$$

The processes described in equation 12 are depicted in blocks 204, 206, 208, and 210 of FIG. 2. DC(t) and AC(t) will be Nyquist sampled provided the sampling interval, Δt, satisfies equation 14.

$$\Delta t < \frac{1}{v_{ext}}, \quad (14)$$

$$\Delta t < \frac{c}{4\gamma z_{ext}},$$

The sampling interval in the frequency space of the target then satisfies equation 15.

$$\Delta f < \frac{c}{4 z_{ext}}. \quad (15)$$

The cross-terms are each the range frequency content of the target multiplied by a conjugate copy shifted by +γτ. The size of this shift in terms of frequency samples, n, is then $$n = \frac{\gamma \tau}{\Delta f} \quad (16)$$

$$n > \frac{4\gamma \tau z_{ext}}{c} > \frac{16\gamma z_{ext}^2}{c^2}.$$

The chirp bandwidth to model a target with resolution $z_{res}$ is given in equation 17. The number of discrete measurements to be recorded is determined by the pulse length, delay between pulses, and the roundtrip delay time of the scene.

$$BW = \frac{c}{2 z_{res}} \quad (17)$$

$$N > \frac{BW + \gamma \tau + \frac{2\gamma z_{ext}}{c}}{\Delta f} \quad (18)$$

$$N > \frac{2 z_{ext}}{z_{res}} + n + \frac{8\gamma z_{ext}^2}{c^2}.$$

After separating the DC and cross terms we will then have two discretely sampled measurements of length N which are a function of the target spectrum.

$$DC_m = |U_m|^2 + |U_{m+n}|^2 = |U(\gamma m\Delta t)|^2 + |U(\gamma(m\Delta t + n\Delta t)|^2 \quad (19)$$

$$AC_m = U_m U_{m+n} = U(\gamma m\Delta t)U^*(\gamma(m\Delta t + n\Delta t)) \quad (20)$$

Here the integer increment of the subscript denotes a Δt change in time, where $DC_1$ and $AC_E$ are the first samples of DC(t) and AC(t) respectively, and UT is the lowest target spatial frequency to be modeled.

If the frequency shift between the shears is less than the required resolution in range frequency and the size of the shift in samples, n, is 1, it is then possible to find the relative phase of target spectrum by integrating the phase of the cross-term. The isolation of this mix term and subsequent integration is equivalent to the process used for the measurement of femtosecond pulses using spectral shearing.

$$n > \frac{4\gamma \tau z_{ext}}{c}, n = 1 \rightarrow 1 > \frac{4\gamma \tau z_{ext}}{c} \quad (21)$$

$$\angle U_1 = 0 \quad (22)$$

$$\angle U_M = \sum_{m=1}^{M-1} \angle(U_{m+1}U_m^*) = \sum_{m=1}^{M-1} \angle AC_m^* \quad (23)$$

The model is blind to the piston phase of the spectrum, so the phase of the first frequency is set to zero and the phase of other frequencies are calculated relatively.

The amplitude of the spectrum can be modeled using the measurements from DC(t), with the assumption that the starting and ending frequency measurements have zero amplitude. This will be the case when the record length of received intensity is greater than the sum of the pulse length, delay between pulses and the round trip delay time of the target. The power spectrum, S, can then be calculated using two different equations, 26 and 28 below, using the assumptions in 25 and 27 respectively.

$$DC_M = |U_M|^2 + |U_{M+1}|^2 = S_M + S_{M+1}, \quad (24)$$

$$S_1 = 0, \quad (25)$$

$$S_M = DC_{M-1} - S_{M-1} \quad (26)$$

$$S_M = DC_{M-1} - DC_{M-2} + \ldots + (-1)^{M-2}DC_1 = \sum_{m=1}^{M-1}(-1)^{m-1}DC_{M-m}$$

$$S_N = 0, \quad (27)$$

$$S_M = DC_M - S_{M+1} \quad (28)$$

$$S_M = DC_M - DC_{M+1} + \ldots + (-1)^{N-M-1}DC_{N-1} = \sum_{m=M}^{N-1}(-1)^{m-M}DC_m \quad (28)$$

In the presence of noise these equations will both be used, with inverse weighting according to their relative expected variances, or equivalently by weighting each proportional to the others variance. If the expected variance of any of the direct current values is equivalent, the variance of the summation will be proportional to the number of terms. The series in equations 26 and 28 have M−1 and N−M terms respectively, and N−1 terms combined. The minimum square error average of the two summations is then $$S_M = \frac{N-M}{N-1}\left(\sum_{m=1}^{M-1}(-1)^{m-1}DC_{M-m}\right) + \frac{M-1}{N-1}\left(\sum_{m=M}^{N-1}(-1)^{m-M}DC_m\right) \quad (29)$$

Equation 29 could be further refined by also taking the amplitude of the cross-terms into consideration, which will be used more extensively in multi-shear cases.

If we form an N by N sparsely populated covariance matrix for U, where the terms of AC will populate a diagonal of the matrix offset by n pixels. Similarly AC* will populate the diagonal offset by −n. The resulting matrix for n=1 is shown on the left of equation 30. Equation 30 shows the result of the matrix multiplication of this matrix with the column vector of the complex spectrum.

$$\begin{bmatrix} 0 & AC_1 & 0 & \cdots & 0 \\ AC_1^* & 0 & AC_2 & \ddots & \vdots \\ 0 & AC_2^* & \ddots & \ddots & 0 \\ \vdots & \ddots & \ddots & 0 & AC_{N-1} \\ 0 & \cdots & 0 & AC_{N-1}^* & 0 \end{bmatrix} \begin{bmatrix} U_1 \\ U_2 \\ \vdots \\ U_{N-1} \\ U_N \end{bmatrix} = \begin{bmatrix} U_1 S_2 \\ U_2(S_1 + S_3) \\ \vdots \\ U_{N-1}(S_{N-2} + S_N) \\ U_N S_{N-1} \end{bmatrix} \quad (30)$$

In equation 30 we see that the rows of the complex spectrum column vector are scaled by terms of power spectrum calculated in equation 29. The sum of the power spectrum, $\Gamma$, is then $$\Gamma = \sum_{m=1}^{N} S_m \quad (31)$$

Equation 31 is then adapted so that the output is a copy of the spectrum scaled by $\Gamma$, this is accomplished by adding terms in the main diagonal.

$$\begin{bmatrix} \Gamma - S_2 & AC_1 & 0 & \cdots & 0 \\ AC_1^* & \Gamma - S_1 - S_3 & AC_2 & \ddots & \vdots \\ 0 & AC_2^* & \ddots & \ddots & 0 \\ \vdots & \ddots & \ddots & \Gamma - S_{N-2} - S_N & AC_{N-1} \\ 0 & \cdots & 0 & AC_{N-1}^* & \Gamma - S_{N-1} \end{bmatrix} \begin{bmatrix} U_1 \\ U_2 \\ \vdots \\ U_{N-1} \\ U_N \end{bmatrix} = \Gamma \begin{bmatrix} U_1 \\ U_2 \\ \vdots \\ U_{N-1} \\ U_N \end{bmatrix} \quad (32)$$

This indicates that the complex spectrum is a scaled eigenvector of the matrix in equation 32. Phase noise in the measurements which are used to form this matrix will result in a reduction in the eigenvalue. In order to find the most likely spectrum vector given noisy measurements the eigenvector corresponding to the largest eigenvalue is calculated. This approach to finding the complex spectrum is similar to maximum likelihood techniques used for PGA, but for PGA the terms in the center diagonal are not required as the solution is a phase only correction as opposed to a complex spectrum with varying amplitude. Similar to the modelling by integrating the phase of the difference term, in order for the solution to be unique, the shear should be less than or equal to the required resolution in range frequency. The matrix based approach is more general and can be extended to the case of multiple shears, in which case the requirement is that the greatest common factor of all the shifts in pixels be less than or equal to the required resolution in range frequency. This is depicted in blocks 222, 224, and 226 of FIG. 2.

When more than two pulses are used, additional mixed terms can be captured by using non-redundant pulse separations in time. For example, let us consider the case $$p_1(t) = e^{j\pi\gamma(t-2\tau)^2} = p(t) \otimes \delta(t-2\tau)$$

$$p_2(t) = e^{j\pi\gamma(t-\tau)^2} = p(t) \otimes \delta(t-\tau)$$

$$p_3(t) = e^{j\pi\gamma(t+\tau)^2} = p(t) \otimes \delta(t+\tau). \quad (33)$$

The receiver intensity is then $$I(t) = |U(\gamma(t-2\tau))|^2 + U(\gamma(t-\tau))^2 + U(\gamma(t+T))^2 + U(\gamma(t-2\tau))$$
$$U^*(\gamma(t-\tau))e^{-j\pi\gamma(2\tau-3\tau^2)} + U(\gamma(t-\tau))U^*$$
$$(\gamma(t-2\tau))e^{j\pi\gamma(2\tau-3\tau^2)} + U(\gamma(t-2\tau))U^*$$
$$(\gamma(t+\tau))e^{-j\pi\gamma(6\tau-3\tau^2)} + U(\gamma(t+\tau))U^*$$
$$(\gamma(t-2\tau))e^{j\pi\gamma(6\tau-3\tau^2)} + U(\gamma(t-\tau))U^*$$
$$(\gamma(t+\tau))e^{-j\pi\gamma(4\tau\tau)} + U(\gamma(t+\tau))U^*((t-\tau))e^{j\pi\gamma(4\tau\tau)}. \quad (34)$$

Using the filtering techniques mentioned above, each of the cross-terms can be isolated. After isolating the various terms (except the DC terms which remain overlapped) we obtain 3 terms and their conjugates. For short hand we will define $T_{(a,b)}$ equal to $U(\gamma(t+a\tau)) U^*(\gamma(t+b\tau))$, which also dictates that $T_{(a,b)} = (T_{(b,a)})^*$. We then have three equations for the spectrum amplitude based on the cross-terms, as given in block 214 of FIG. 2.

$$|U(\gamma(t-2\tau))|^2 = \frac{|T_{-2,-1} T_{1,-2}|}{|T_{1,-1}|}, \quad (35)$$

$$|U(\gamma(t-\tau))|^2 = \frac{|T_{-1,-2} T_{-1,-1}|}{|T_{1,-2}|},$$

$$|U(\gamma(t+\tau))|^2 = \frac{|T_{1,-2} T_{-1,1}|}{|T_{-1,-2}|}.$$

To calculate $|U(\gamma t)|^2$ we appropriately shift each of these equations and perform a weighted average where the denominator is the weight for each term, as given in block 216 of FIG. 2, with output as given in block 218.

$$|U(\gamma t)|^2 = \frac{|T_{-2,-1} T_{1,-2}| \otimes \delta(t+2\tau) + |T_{-1,-2} T_{1,-1}| \otimes \delta(t+\tau) +}{|T_{1,-1}| \otimes \delta(t+2\tau) + |T_{1,-2}| \otimes \delta(t+\tau) + |T_{-1,-2}| \otimes \delta(t-\tau)}. \quad (36)$$

Similar to equation 32 above a matrix based approach can be used to find the phase, but in this case two additional alternating current terms are used to populate diagonals above and below the diagonals populated in equation 32.

Equation 37 gives the transmit waveforms for a non-redundant 4 shear case $$p_1(t) = e^{j\pi\gamma(t-3\tau)^2} = p(t) \otimes \delta(t-3\tau)$$

$$p_2(t) = e^{j\pi\gamma(t-2\tau)^2} = p(t) \otimes \delta(t-2\tau)$$

$$p_3(t) = e^{j\pi\gamma(t+\tau)^2} = p(t) \otimes \delta(t+\tau)$$

$$p_4(t) = e^{j\pi\gamma(t+3\tau)^2} = p(t) \otimes \delta(t+3\tau). \quad (37)$$

The receiver intensity is then given in equation 38 below followed by the equations for the various signal amplitudes.

$$I(t) = |U(\gamma(t-3\tau))|^2 + |U(\gamma(t-2\tau))|^2 + |U(\gamma(t+\tau))|^2 + \quad (38)$$
$$|U(\gamma(t+3\tau))|^2 + U(\gamma(t-3\tau))U^*(\gamma(t-2\tau))e^{-j\pi\gamma(2\tau t-5\tau^2)} +$$
$$U(\gamma(t-2\tau))U^*(\gamma(t-3\tau))e^{j\pi\gamma(2\tau t-5\tau^2)} +$$
$$U(\gamma(t-3\tau))U^*(\gamma(t+\tau))e^{-j\pi\gamma(8\tau t-8\tau^2)} +$$
$$U(\gamma(t+\tau))U^*(\gamma(t-3\tau))e^{j\pi\gamma(8\tau t-8\tau^2)} +$$
$$U(\gamma(t-3\tau))U^*(\gamma(t+3\tau))e^{-j\pi\gamma(12\tau t)} +$$
$$U(\gamma(t+3\tau))U^*(\gamma(t-3\tau))e^{j\pi\gamma(12\tau t)} +$$
$$U(\gamma(t-2\tau))U^*(\gamma(t+\tau))e^{-j\pi\gamma(6\tau t-3\tau^2)} +$$
$$U(\gamma(t+\tau))U^*(\gamma(t-2\tau))e^{j\pi\gamma(6\tau t-3\tau^2)} +$$
$$U(\gamma(t-2\tau))U^*(\gamma(t+3\tau))e^{-j\pi\gamma(10\tau t+5\tau^2)} +$$
$$U(\gamma(t+3\tau))U^*(\gamma(t-2\tau))e^{j\pi\gamma(10\tau t+5\tau^2)} +$$
$$U(\gamma(t+\tau))U^*(\gamma(t+3\tau))e^{-j\pi\gamma(4\tau t+8\tau^2)} +$$
$$U(\gamma(t+3\tau))U^*(\gamma(t+\tau))e^{j\pi\gamma(4\tau t+8\tau^2)}$$

$$|U(\gamma(t-3\tau))|^2 = \frac{T_{-3,-2}T_{1,-3}}{T_{1,-2}} = \frac{T_{-3,-2}T_{3,-3}}{T_{3,-2}} = \frac{T_{-3,1}T_{3,-3}}{T_{3,1}} \quad (39)$$

$$|U(\gamma(t-2\tau))|^2 = \frac{T_{-2,-3}T_{1,-2}}{T_{1,-3}} = \frac{T_{-2,-3}T_{3,-2}}{T_{3,-3}} = \frac{T_{-2,1}T_{3,-2}}{T_{3,1}} \quad (40)$$

$$|U(\gamma(t+\tau))|^2 = \frac{T_{1,-3}T_{-2,1}}{T_{-2,-3}} = \frac{T_{1,-3}T_{3,1}}{T_{3,-3}} = \frac{T_{1,-2}T_{3,1}}{T_{3,-2}} \quad (41)$$

$$|U(\gamma(t+3\tau))|^2 = \frac{T_{3,-3}T_{-2,3}}{T_{-2,-3}} = \frac{T_{3,-3}T_{1,3}}{T_{1,-3}} = \frac{T_{3,-2}T_{1,3}}{T_{1,-2}} \quad (42)$$

The alternating current beat terms can once again be used to populate a matrix similar to 32 with additional diagonals populated to improve the quality of models.

While the math here has been focused on the model for a single one-dimensional signal, this can be extended to multiple receiver pixels in a straight forward manner. With the incorporation of multiple receiver pixels this also allows for shears to have a spatial component as well by separating any number of the transmit locations. The model can be approached using a number of parallel models which are later combined, or simultaneously over all dimensions. The latter can be achieved by linearizing the 3 dimensional spectrums representation for the purpose of populating a sparse covariance matrix similar to equation 32, where the diagonal populated by each beat term is determined by both the spectral and spatial shear. In addition to the measured covariances, the system can be further conditioned based on assumptions of continuous well sampled phase variations in each of the spectral dimensions in a similar fashion to phase gradient autofocus.

With regard to blocks 220, 228, and 230 of FIG. 2, irrespective of the data conditioning method implemented prior to forming the covariance matrix, once the eigenvector corresponding to the largest eigenvalue is found, only the phase information is used. This vector is reshaped corresponding to the dimensionality of the input data and how it was linearized to form the covariance matrix. This phase is then combined with the computed amplitude information, to form the complex target spatial frequency content. This is then Fourier transformed along all dimensions, yielding the complex target reflectivity as function of spatial location.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A ladar device, comprising:
a linear frequency-modulated laser source configured to produce a primary beam,
an optical shear generator configured to spectrally shear the primary beam into no less than three sensing beams,
an optical output configured to deliver at least one of the sensing beams toward a target, the sensing beams reflecting from the target to produce reflected beams,
an optical receiver configured to receive the reflected beams and produce reflected beam signals corresponding to characteristics of the reflected beams,
a processor configured to receive the reflected beam signals and produce a deviation matrix using only relationships between the reflected beam signals, and using the deviation matrix to produce a reconstruction of the target, and
an electrical signal output configured to output the reconstruction.

2. The ladar device of claim 1, wherein the laser source is operated in a continuous wave mode and not in a pulsed mode.

3. The ladar device of claim 1, wherein the optical shear generator comprises optical paths of differing lengths and at least one optical divider that creates the sensing beams and sends them down the optical paths.

4. The ladar device of claim 1, wherein the optical output recombines the sensing beams along a common path prior to delivering the sensing beams toward the target.

5. The ladar device of claim 1, wherein the optical receiver is a single pixel device.

6. The ladar device of claim 1, wherein the optical receiver is a device with a one-dimensional pixel array.

7. The ladar device of claim 1, wherein the optical receiver has an imaging device at a pupil plane of the optical receiver, and no focusing lens.

8. The ladar device of claim 1, wherein the optical shear generator comprises a frequency shifter for each sensing beam created.

9. The ladar device of claim 1, wherein the characteristics of both the reflected beams and the sensing beams include both amplitude and phase information.

10. A ladar device, comprising:
a continuous mode, linear frequency-modulated laser source configured to produce a primary beam,
an optical shear generator configured to spectrally shear the primary beam into no less than three sensing beams, comprising optical paths of differing lengths and at least one optical divider that creates the sensing beams and sends them down the optical paths,
an optical output configured to deliver all of the sensing beams toward a target, the sensing beams reflecting from the target to produce reflected beams,
an optical receiver configured to receive the reflected beams and produce reflected beam signals corresponding to characteristic of the reflected beams,
a processor configured to receive the reflected beam signals and produce a deviation matrix using only relationships between the reflected beam signals, and using the deviation matrix to produce a reconstruction of the target, and an electrical signal output configured to output the reconstruction.

11. The ladar device of claim 10, wherein the optical output recombines the sensing beams along a common path prior to delivering the sensing beams toward the target.

12. The ladar device of claim 10, wherein the optical receiver is a single pixel device.

13. The ladar device of claim 10, wherein the optical receiver is a device with a one-dimensional pixel array.

14. The ladar device of claim 10, wherein the optical receiver has an imaging device at a pupil plane of the optical receiver, and no focusing lens.

15. The ladar device of claim 10, wherein the characteristics of both the reflected beams and the sensing beams include both amplitude and phase information.

16. A ladar device, comprising:
at least one linear frequency-modulated laser source configured to produce at least three spectrally-distinct sensing beams,
at least one optical output configured to deliver the sensing beams toward a target, the sensing beams at least one of passing through and reflecting from the target to produce at least one of transmitted beams and reflected beams, respectively,
an optical receiver having an imaging device at a pupil plane of the optical receiver, and no focusing lens, configured to receive at least one of the transmitted beams and the reflected beams and produce signals corresponding to characteristics of at least one of the transmitted beams and the reflected beams,
a processor configured to receive the signals and produce a deviation matrix using only relationships between the signals, and using the deviation matrix to produce a reconstruction of the target, and
an electrical signal output configured to output the reconstruction.

17. The ladar device of claim 16, wherein at least one of the sensing beams is produced with an optical shear generator, comprising optical paths of differing lengths, and at least one optical divider that creates at least one of the sensing beams and sends it down one of the optical paths.

18. The ladar device of claim 16, wherein at least one of the sensing beams is produced with an optical shear generator, comprising a frequency shifter.

19. The ladar device of claim 16, wherein the at least one laser source is operated in a continuous wave mode and not in a pulsed mode.

20. The ladar device of claim 16, wherein the optical receiver is a device with a one-dimensional pixel array.

* * * * *